US012802868B2

(12) United States Patent
Chen et al.

(10) Patent No.: US 12,802,868 B2
(45) Date of Patent: Nov. 17, 2026

(54) MAGNETIC COMPONENT AND MAGNETIC CORE THEREOF

(71) Applicant: LITE-ON Technology Corporation, Taipei City (TW)

(72) Inventors: Chen Chen, Taipei City (TW); De-Jia Lu, Taipei City (TW); Chao-Lin Chung, Taipei City (TW)

(73) Assignee: LITE-ON Technology Corporation, Taipei (TW)

( * ) Notice: Subject to any disclaimer, the term of this patent is extended or adjusted under 35 U.S.C. 154(b) by 953 days.

(21) Appl. No.: 17/897,233

(22) Filed: Aug. 29, 2022

(65) Prior Publication Data

US 2023/0223185 A1 Jul. 13, 2023

(30) Foreign Application Priority Data

Jan. 7, 2022 (TW) ................................ 111100843

(51) Int. Cl.
*H01F 27/24* (2006.01)
*H01F 27/30* (2006.01)

(52) U.S. Cl.
CPC ........... *H01F 27/306* (2013.01); *H01F 27/24* (2013.01)

(58) Field of Classification Search
CPC .... H01F 27/306; H01F 27/24; H01F 27/2823; H01F 27/38; H01F 3/14
See application file for complete search history.

(56) References Cited

U.S. PATENT DOCUMENTS 5,117,214 A 5/1992 Sturgeon et al.
8,564,976 B2 * 10/2013 Reddy .................. H02M 3/285 363/21.02
2007/0046415 A1 * 3/2007 Wadlington ............ H01F 30/12 336/212
2008/0211615 A1 * 9/2008 Ushijima ................ H01J 61/56 336/170
2009/0167473 A1 * 7/2009 Hsieh ...................... H01F 30/06 336/170
2010/0019875 A1 * 1/2010 Ger .......................... H01F 3/10 336/220
2010/0301982 A1 * 12/2010 Bordin ................. H05B 45/397 336/170
2011/0101865 A1 * 5/2011 Cheng ................ H05B 41/2822 315/121

(Continued)

FOREIGN PATENT DOCUMENTS

CN 2069606 U 1/1991
CN 113380517 A 9/2021

(Continued)

*Primary Examiner* — Mang Tin Bik Lian

(57) ABSTRACT

A magnetic component is provided. The magnetic component comprises a primary coil group, a secondary coil group, and a magnetic core. A first primary coil and a second primary coil of the primary coil group are winding around a first winding column and a second winding column of the magnetic core, respectively. The number of turns of the first primary coil is different from the number of turns of the second primary coil. A first secondary coil and a second secondary coil of the secondary coil group are winding around the first winding column and the second winding column, respectively. The number of turns of the first secondary coil is different from the turns of the second secondary coil.

5 Claims, 14 Drawing Sheets

(56) References Cited

U.S. PATENT DOCUMENTS

| | | | | |
|---|---|---|---|---|
| 2012/0223797 | A1* | 9/2012 | Won | H01F 27/306 336/170 |
| 2013/0083575 | A1* | 4/2013 | Kippley | H01F 27/38 363/64 |
| 2014/0266534 | A1* | 9/2014 | Shi | H01F 27/24 336/178 |
| 2015/0054611 | A1* | 2/2015 | Cambronero Garcia | H01F 27/385 336/178 |
| 2018/0061560 | A1* | 3/2018 | Wukovits | H02M 3/24 |
| 2020/0286670 | A1* | 9/2020 | Sigamani | H01F 27/28 |

FOREIGN PATENT DOCUMENTS

| | | | |
|---|---|---|---|
| TW | 289831 | B | 11/1996 |
| TW | 200721208 | A | 6/2007 |
| TW | M322606 | U | 11/2007 |

* cited by examiner

MAGNETIC COMPONENT AND MAGNETIC CORE THEREOF

CROSS-REFERENCE TO RELATED APPLICATION

This application claims the priority benefit of Taiwanese Patent Application Serial Number 111100843, filed on Jan. 7, 2022, the full disclosure of which is incorporated herein by reference.

BACKGROUND

Technical Field

The present disclosure relates to the technical field of magnetic component and magnetic core thereof, particularly to a magnetic component and magnetic core that is properly sized and keeps the energy conversion efficiency at a good level.

Related Art

Magnetic component is one of the crucial parts widely used in various electronic products. In recent years, due to the awareness of environmental consciousness, the power sources of many fossil-fueled mobile vehicles such as buses and cars have been switched to electric drives. Such mobile vehicles require an onboard battery charger (OBC), which could dynamically adjust the electric current or voltage parameters of the mobile vehicle during charging according to data provided by battery management system and then perform related actions for charging.

Since the magnetic component installed in the onboard battery charger is significantly oversized, the overall circuit would occupy a large part of space, thereby affecting the installation of other electrical components. However, simply reducing the size of the magnetic component would restrict the winding space for coil and further affect the conversion efficiency.

Thus, the present disclosure provides a magnetic component and a magnetic core thereof that can reduce the overall size and maintain excellent energy conversion efficiency.

SUMMARY

The embodiments of the present disclosure provide a magnetic component and a magnetic core thereof tended to solve the problem that the magnetic component installed in the onboard battery charger is oversized to cause the overall circuit to occupy too much space and affect the installation of other electrical components.

The present disclosure provides a magnetic component, comprising:

- a primary coil group comprising a first primary coil and a second primary coil;
- a secondary coil group comprising a first secondary coil and a second secondary coil; and
- a magnetic core, comprising:
  - a first cover and a second cover;
  - a central column connecting with the first cover and the second cover, no air gap existing between the central column and the first cover and between the central column and the second cover; and
  - a first winding column and a second winding column respectively disposed on two opposite sides of the central column;
- wherein, the first primary coil and the second primary coil are respectively winding around the first winding column and the second winding column, where the number of turns of the first primary coil is different from the number of turns of the second primary coil; the first secondary coil and the second secondary coil are respectively winding around the first winding column and the second winding column, where the number of turns of the first secondary coil is different from the number of turns of the second secondary coil.

In the magnetic component of the present disclosure, the first winding column and the second winding column are connected to the first cover. An air gap exists between the first winding column and the second cover and between the second winding column and the second cover.

In the magnetic component of the present disclosure, the first winding column and the second winding column are respectively connected to the central column.

In the magnetic component of the present disclosure, the magnetic component further comprises a first supporting column and a second supporting column, which are respectively connected to the first cover and the second cover. The first winding column is disposed between the first supporting column and the central column. The second winding column is disposed between the second supporting column and the central column.

In the magnetic component of the present disclosure, the first winding column or the second winding column comprises an air gap.

In the magnetic component of the present disclosure, the magnetic component further comprises a third winding column and a fourth winding column, which are respectively disposed at the first supporting column and the second supporting column. A third primary coil and a fourth primary coil of the primary coil group are respectively winding around the third winding column and the fourth winding column. A third secondary coil and a fourth secondary coil of the secondary coil group are respectively winding around the third winding column and the fourth winding column.

In the magnetic component of the present disclosure, one end of the first winding column is connected to the first supporting column. An air gap exists between the other end of the first winding column and the central column. One end of the second winding column is connected to the second supporting column. An air gap exists between the other end of the second winding column and the central column.

In the magnetic component of the present disclosure, the first winding column comprises a first cross-sectional area. The second winding column comprises a second cross-sectional area. The first cross-sectional area is not equal to the second cross-sectional area.

In the magnetic component of the present disclosure, a wire diameter of the first primary coil of the primary coil group is not equal to a wire diameter of the second primary coil of the primary coil group.

In the magnetic component of the present disclosure, a wire diameter of the first secondary coil of the secondary coil group is not equal to a wire diameter of the second secondary coil of the secondary coil group.

In the magnetic component of the present disclosure, the first primary coil is electrically connected to the second primary coil via a first external circuit, or the first secondary coil is electrically connected to the second secondary coil via a second external circuit.

The present disclosure further provides a magnetic core, comprising:

- a first cover and a second cover;
- a central column connecting with the first cover and the second cover, no air gap existing between the central column and the first cover and between the central column and the second cover; and
- a first winding column and a second winding column respectively disposed on two opposite sides of the central column.

In the magnetic core of the present disclosure, the first winding column and the second winding column are connected to the first cover. An air gap exists between the first winding column and the second cover and between the second winding column and the second cover.

In the magnetic core of the present disclosure, the first winding column and the second winding column are respectively connected to the central column.

In the magnetic core of the present disclosure, the magnetic core further comprises a first supporting column and a second supporting column, which are respectively connected to the first cover and the second cover. The first winding column is disposed between the first supporting column and the central column. The second winding column is disposed between the second supporting column and the central column.

In the magnetic core of the present disclosure, the first winding column or the second winding column comprises an air gap respectively.

In the magnetic core of the present disclosure, the magnetic core further comprises a third winding column and a fourth winding column, which are respectively disposed at the first supporting column and the second supporting column.

In the magnetic core of the present disclosure, one end of the first winding column is connected to the first supporting column. An air gap exists between the other end of the first winding column and the central column. One end of the second winding column is connected to the second supporting column. An air gap exists between the other end of the second winding column and the central column.

In the magnetic core of the present disclosure, the first winding column has a first cross-sectional area. The second winding column has a second cross-sectional area. The first cross-sectional area is not equal to the second cross-sectional area.

In the embodiments of the present disclosure, in the structural design of zero air gap between the central column and the first cover and between the central column and the second cover, the structural configuration of the magnetic component and the magnetic core can be simplified, and in the case of downsizing to still perform excellent energy conversion efficiency.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1A:
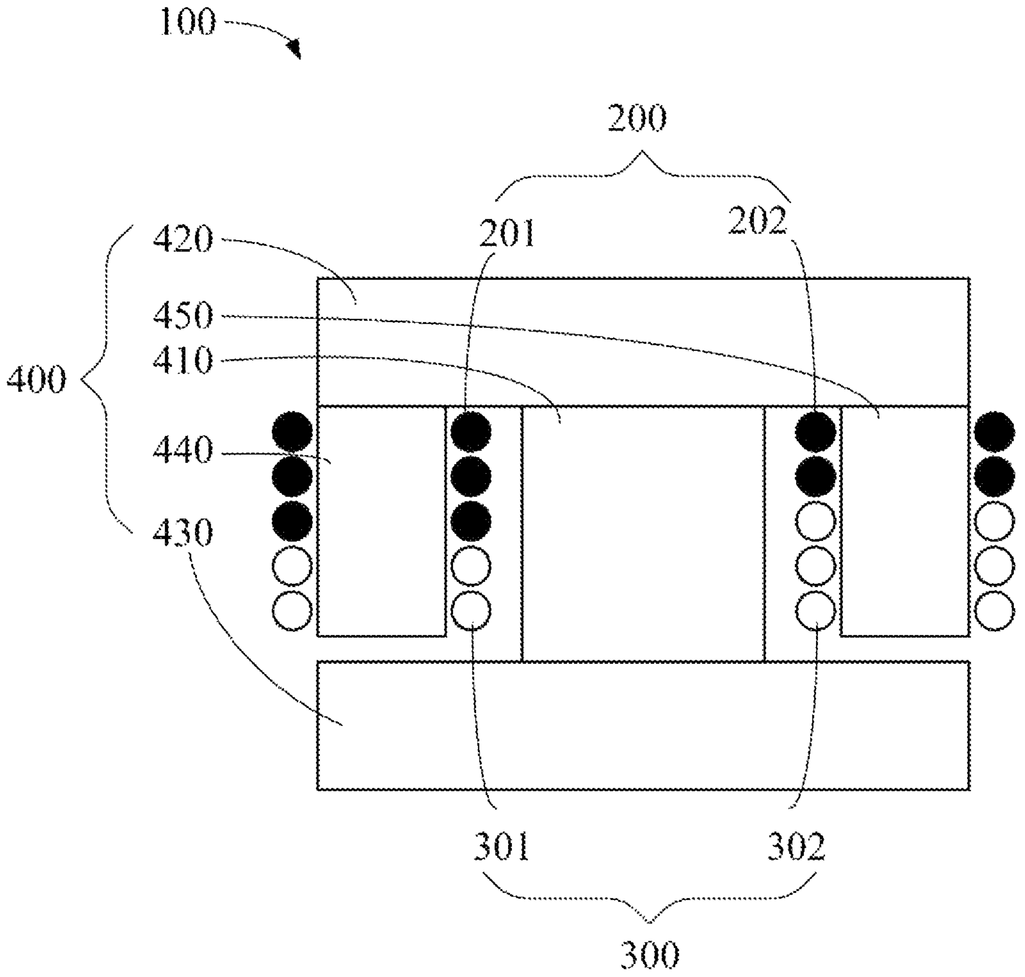
FIG. 1A and FIG. 1B are schematic diagrams of a magnetic component of the first embodiment of the present disclosure.

As shown in the first embodiment of FIG. 1A, the present disclosure provides a magnetic component 100, which comprises a primary coil group 200, a secondary coil group 300, and a magnetic core 400. The primary coil group 200 comprises a first primary coil 201 and a second primary coil 202. The secondary coil group 300 comprises a first secondary coil 301 and a second secondary coil 302. The magnetic core 400 comprises a first cover 420, a second cover 430, a central column 410, a first winding column 440, and a second winding column 450. The center column 410 is connected to the first cover 420 and the second cover 430, and there is no air gap between the center column 410 and the first cover 420 and between the center column 410 and the second cover 430. The first winding column 440 and the second winding column 450 are respectively disposed on two opposite sides of the central column 410.

Wherein, the first primary coil 201 and the second primary coil 202 are respectively winding around the first winding column 440 and the second winding column 450. The number of turns of the first primary coil 201 is different from the number of turns of the second primary coil 202. The first secondary coil 301 and the second secondary coil 302 are respectively winding around the first winding column 440 and the second winding column 450. The number of turns of the first secondary coil 301 is different from the number of turns of the second secondary coil 302.

Figure 1B:
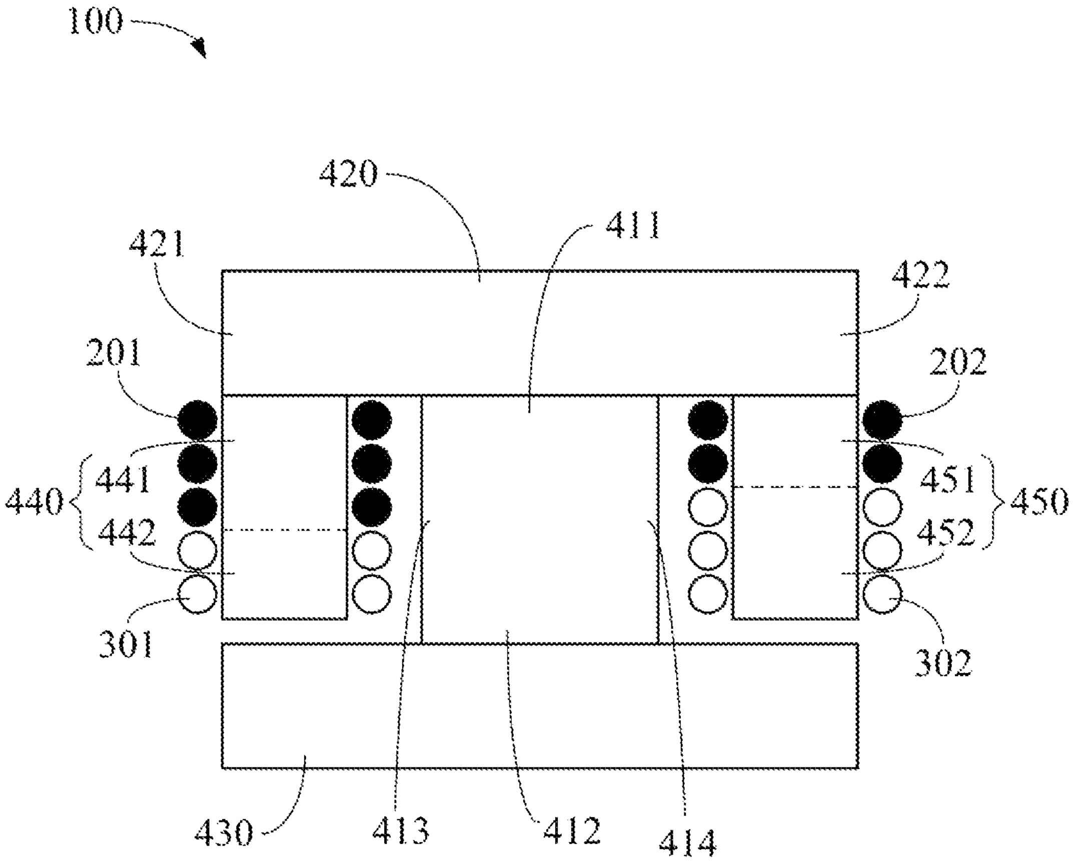

Referring to FIG. 1B, the central column 410 comprises a first end 411, a second end 412, a first side edge 413, and a second side edge 414. The second end 412 and the first end 411 are oppositely disposed, and the first side edge 413 and the second side edge 414 are disposed between the first end 411 and the second end 412 and are oppositely disposed. The first cover 420 and the second cover 430 are respectively disposed on the first end 411 and the second end 412 of the central column 410. The first winding column 440 and the second winding column 450 are respectively disposed on two opposite sides of the central column 410. The first winding column 440 comprises a first winding part 441 and a second winding part 442, and the second winding column 450 comprises a third winding part 451 and a fourth winding part 452. Wherein, the first primary coil 201 and the second primary coil 202 of the primary coil group 200 are respectively winding around the first winding part 441 of the first winding column 440 and the third winding part 451 of the second winding column 450, and the first secondary coil 301 and the second secondary coil 302 of the secondary coil group 300 are respectively winding around the second winding part 442 of the first winding column 440 and the fourth winding part 452 of the second winding column 450.

Specifically, as shown in FIG. 1B, in the first embodiment of the magnetic component 100 of the present disclosure, the first cover 420 comprises a first cover end 421 and a second cover end 422, which are oppositely disposed. The first winding column 440 and the second winding column 450 are respectively disposed on the first cover end 421 and the second cover end 422 of the first cover 420. In other words, the first winding column 440 and the second winding column 450 are respectively disposed on two opposite ends of the first cover 420.

In the present disclosure, since there is no air gap existing between the central column 410 of the magnetic component 100 and the first cover 420 and between the central column 410 of the magnetic component 100 and the second cover 430 when designing the magnetic component 100 based on a specific leakage inductance, it is only necessary to simply consider the ratio of the number of turns of the primary coil group 200 to the number of turns of the secondary coil group 300 winding on the magnetic core 400, and to wind the primary coil group 200 and the secondary coil group 300 respectively on the first winding column 440 and the second winding column 450 in an equal number of turns. So, in the case of effectively downsizing the magnetic component 100, the total loss obtained by reducing the total core loss and copper loss during AC charging could be reduced by adjusting the ratio of the number of turns of the primary coil group 200 and the secondary coil group 300 wound on the magnetic core 400 for excellent energy conversion efficiency.

In the embodiments of the present disclosure, the primary coil group 200 and the secondary coil group 300 can be, for example, coil groups such as enameled wire windings, Litz wire windings, metal foil windings, printed circuit board windings, etc., which are not limited herein.

Figure 2:
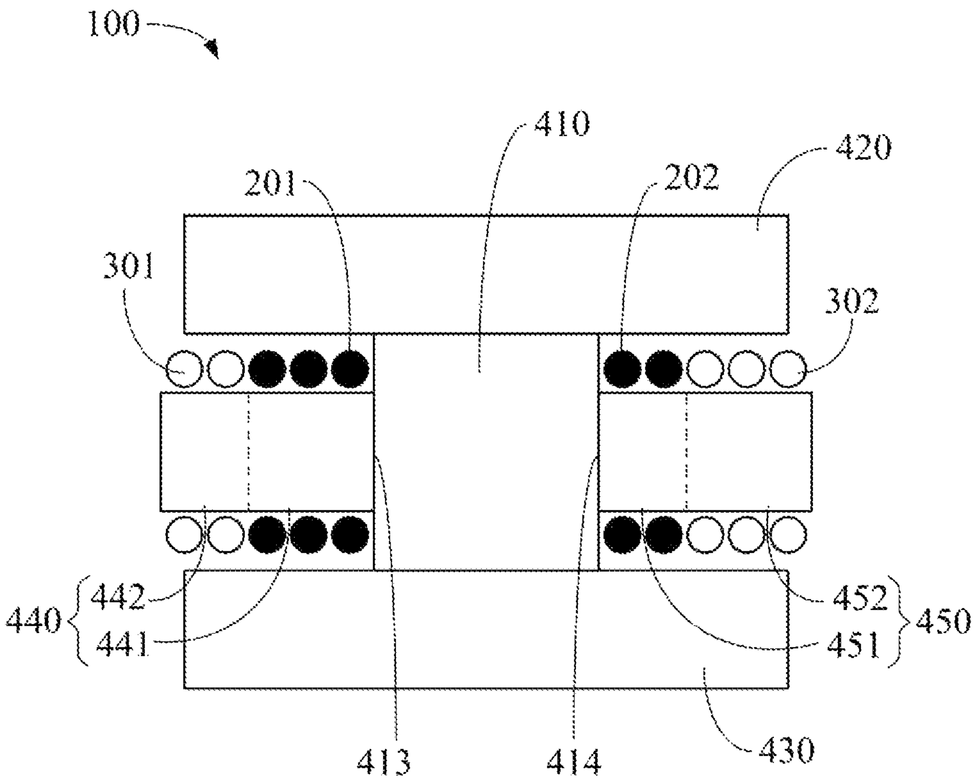
FIG. 2 is a schematic diagram of a magnetic component of the second embodiment of the present disclosure.

As shown in FIG. 2, the magnetic component 100 of the second embodiment of the present disclosure comprises the same components as the first embodiment, and there is also no air gap between the central column 410 and the first cover 420 and between the central column 410 and the second cover 430. The difference between the second embodiment and the first embodiment is that in the second embodiment, the first winding column 440 and the second winding column 450 can be connected to the central column 410 respectively. That is, in the second embodiment, the first winding column 440 and the second winding column 450 are respectively disposed at the first side edge 413 and the second side edge 414 of the central column 410, so that the magnetic component 100 has an up-down symmetrical configuration centered on a horizontal line.

Similar to the first embodiment, since no air gap exists between the center column 410 and the first cover 420 and between the center column 410 and the second cover 430 in the second embodiment when controlling the leakage inductance, it is only necessary to consider allowing the ratio of the number of turns of the primary coil group 200 to the secondary coil group 300 respectively wound on the first winding column 440 and the second winding column 450 to be unequal. So, in the case of downsizing effectively of the structural configuration of the second embodiment, the total loss obtained by reducing the total core loss and copper loss during AC charging could be reduced by adjusting the ratio of the number of turns of the primary coil group 200 and the secondary coil group 300 respectively wound on the first winding column 440 and the second winding column 450 for excellent energy conversion efficiency.

In another form of embodiment of the present disclosure, besides the parts included in the first embodiment, the magnetic component 100 further comprises a first supporting column 460 and a second supporting column 470, which are respectively connected to the first cover 420 and the second cover 430. The first winding column 440 is disposed between the first supporting column 460 and the central column 410, and the second winding column 450 is disposed between the second supporting column 470 and the central column 410.

Embodiments in this form would be described below.

Figure 3A:
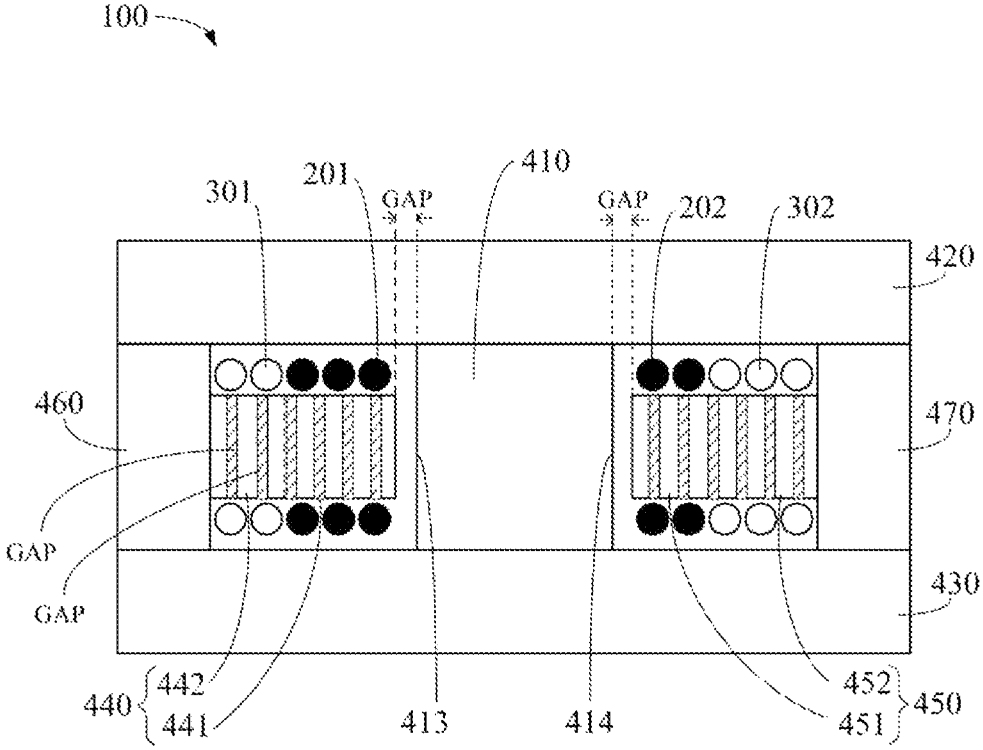
FIG. 3A is a schematic diagram of a magnetic component of the third embodiment of the present disclosure.

FIG. 3A shows a third embodiment of the magnetic component 100 of the present disclosure. In addition to having the same parts as the first embodiment, the magnetic component 100 in the third embodiment further comprises a first supporting column 460 and a second supporting column 470. The first supporting column 460 is sandwiched between the first cover 420 and the second cover 430 and is away from the first side edge 413 of the central column 410, and the second supporting column 470 is sandwiched between the first cover 420 and the second cover 430 and is away from the second side edge 414 of the central column 410. The first winding column 440 and the second winding column 450 are respectively disposed at the first supporting column 460 and the second supporting column 470.

The first supporting column 460 and the second supporting column 470 strengthen the supporting between the first cover 420 and the second cover 430, thereby enabling the magnetic component 100 to be more stable. Besides, in FIG. 3A, a plurality of air gaps GAP exist between the first winding column 440 and the second winding column 450. The plurality of air gaps GAP are described below as an example that they are equally distributed to the first winding column 440 and the second winding column 450. However, in actual application, the number and disposing position of the air gaps GAP can be adjusted according to requirements. By disposing the first winding column 440 at the first supporting column 460 and disposing the second winding column 450 on the second supporting column 470, the gaps of the air gaps GAP of the first winding column 440 and of the second winding column 450 can be maintained in a stable distance.

On the other hand, in the third embodiment, since both the primary coil group 200 and the secondary coil group 300 are covered inside the magnetic core 400, the leakage magnetic flux generated by the primary coil group 200 and the secondary coil group 300 would not be gone into the outside of the devices. This can not only reduce the electromagnetic interference caused by the magnetic component 100 to other surrounding devices but also reduce the electromagnetic interference caused by other devices to the magnetic component 100 of the present application. Thus, the structural configuration of the third embodiment of the magnetic component 100 could effectively reduce the issue of electromagnetic compatibility (EMC).

Figure 3B:
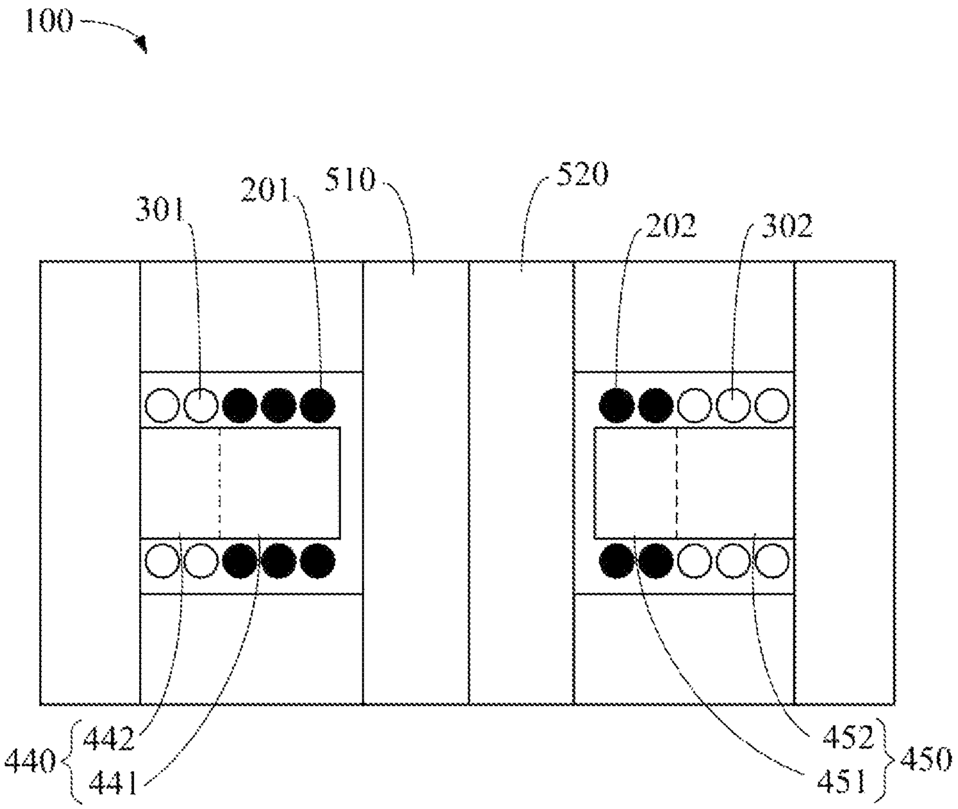
FIG. 3B is a schematic diagram of the magnetic component of the third embodiment in another form of the present disclosure.

It should be noted that the central column of the third embodiment can also be formed by combining two columns. As shown in FIG. 3B, the central column comprises a first central column 510, and a second central column 520. That is, in this embodiment, the magnetic component 100 can be regarded as comprising two independent transformers that are mutually connected.

Figure 4:
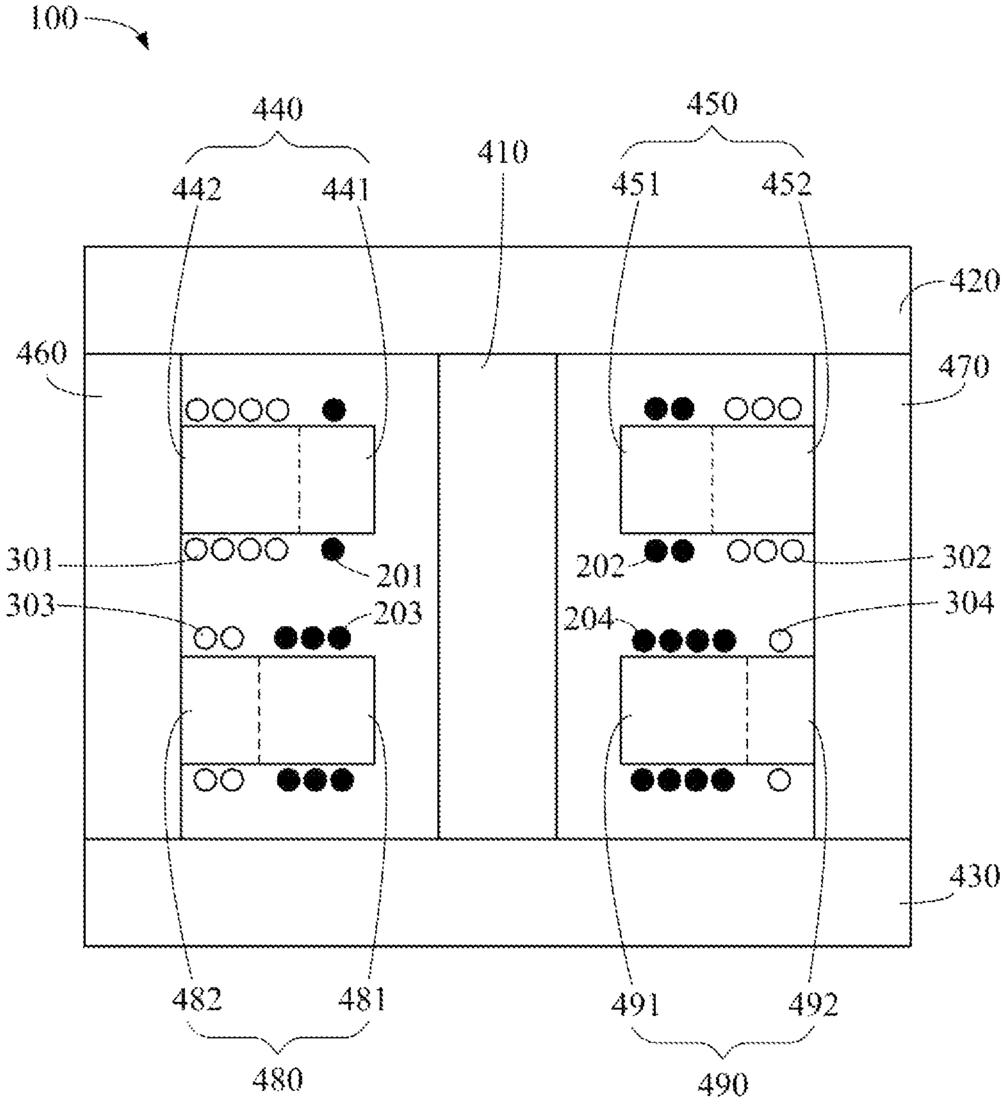
FIG. 4 is a schematic diagram of a magnetic component of the fourth embodiment of the present disclosure.

FIG. 4 shows a fourth embodiment of the magnetic component 100 of the present disclosure. The fourth embodiment of the magnetic device 100 comprises a third winding column 480 and a fourth winding column 490 in addition to the first supporting column 460 and the second supporting column 470 which are the same as those of the third embodiment. The third winding column 480 and the fourth winding column 490 are respectively disposed at the first supporting column 460 and the second supporting column 470. A third primary coil 203 and a fourth primary coil 204 of the primary coil group 200 are respectively winding around the third winding column 480 and the fourth winding column 490, and a third secondary coil 303 and a fourth secondary coil 304 of the secondary coil group 300 are respectively winding around the third winding column 480 and the fourth winding column 490.

That is, the structural configuration the fourth embodiment is modified so that the first winding column 440 and the third winding column 480 are disposed at the first supporting column 460, and the second winding column 450 and the fourth winding column 490 are disposed at the second supporting column 470.

As shown in the figure, the third winding column 480 comprises a fifth winding part 481 and a sixth winding part 482, and the fourth winding column 490 comprises a seventh winding part 491 and an eighth winding part 492. So, except that the first primary coil 201 and the second primary coil 202 of the primary coil group 200 can be respectively winding around the first winding part 441 of the first winding column 440 and the third winding part 451 of the second winding column 450, the third primary coil 203 and the fourth primary coil 204 of the primary coil group 200 are respectively winding on the fifth winding part 481 of the third winding column 480 and the seventh winding part 491 of the fourth winding column 490. The number of turns of the first primary coil 201, the second primary coil 202, the third primary coil 203, and the fourth primary coil 204 is not equal.

Correspondingly, except that the first secondary coil 301 and the second secondary coil 302 of the secondary coil group 300 can be respectively winding around the second winding part 442 of the first winding column 440 and the fourth winding part 452 of the second winding column 450. The third secondary coil 303 and the fourth secondary coil 304 of the secondary coil group 300 are respectively winding around the sixth winding part 482 of the third winding column 480 and the eighth winding part 492 of the fourth winding column 490. The number of turns of the first secondary coil 301, the second secondary coil 302, the third secondary coil 303, and the fourth secondary coil 3044 is also not equal.

In addition to stabilizing the distance of air gap of each winding column, the configuration that the first winding column 440 and the third winding column 480 are disposed at the first supporting column 460, and the second winding column 450 and the fourth winding column 490 are disposed at the second supporting column 470 also enables the height of the winding column of the magnetic component 100 thinner, thereby effectively reducing the overall size of the magnetic component 100.

It should be noted that, in the fourth embodiment, since the third primary coil 203, the fourth primary coil 204, the third secondary coil 303, and the fourth secondary coil 304 are further included, the ratio of the turns of the primary coil group 200 to the secondary coil group 300 on each winding column is also adjusted accordingly to ensure that the turns of each coil are not equal.

Figure 5A:
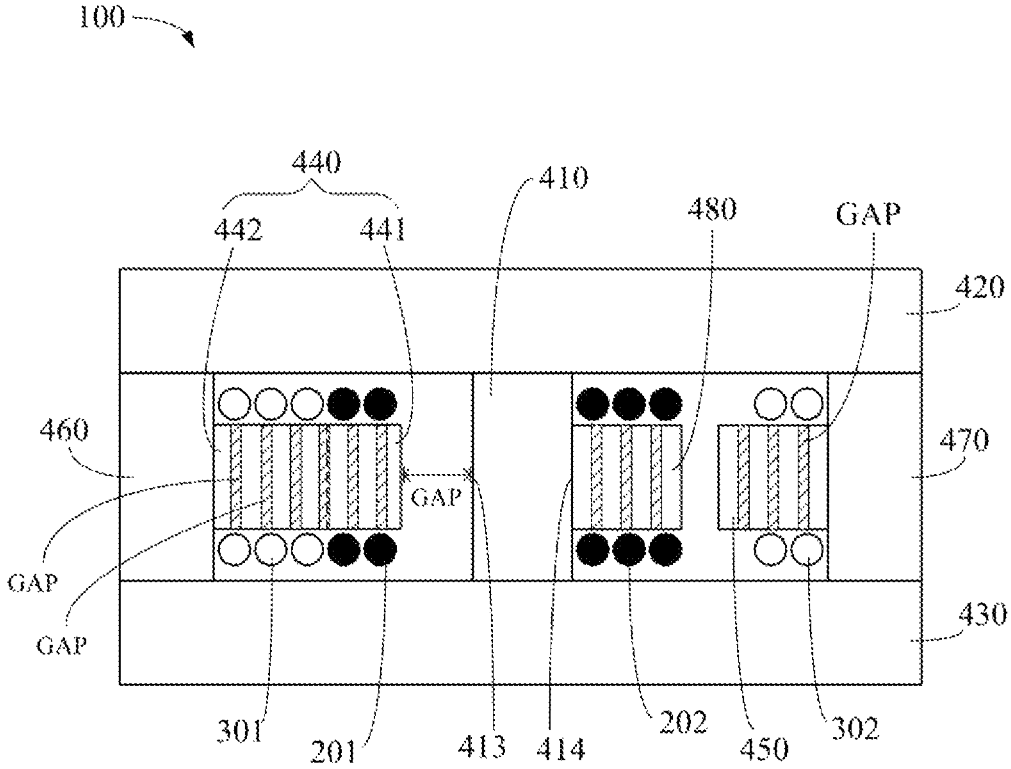
FIG. 5A is a schematic diagram of a magnetic component of the fifth embodiment of the present disclosure.

FIG. 5A shows a fifth embodiment of the magnetic component 100 of the present disclosure, which is a variant of FIG. 3A. The difference between the magnetic component 100 of the fifth embodiment and that of FIG. 3A is that the fifth embodiment further comprises a third winding column 480, and the first winding column 440 is disposed at the first supporting column 460, the second winding column 450 is disposed at the second supporting column 470, and the third winding column 480 is disposed at the second side edge 414 of the central column 410.

Thus, the first primary coil 201 and the second primary coil 202 of the primary coil group 200 are respectively winding around the first winding part 441 and the third winding column 480 of the first winding column 440, and the first secondary coil 301 and the second secondary coil 302 of the secondary coil group 300 are respectively winding around the second winding part 442 and the second winding column 450 of the first winding column 440.

Since the primary coil group 200 and the secondary coil group 300 are both covered on an inner side of the magnetic core 400, the leakage magnetic fluxes generated by the primary coil group 200 and the secondary coil group 300 of the fifth embodiment would also not be leaked. In this way, the problem of electromagnetic compatibility can be effectively reduced.

Figure 5B:
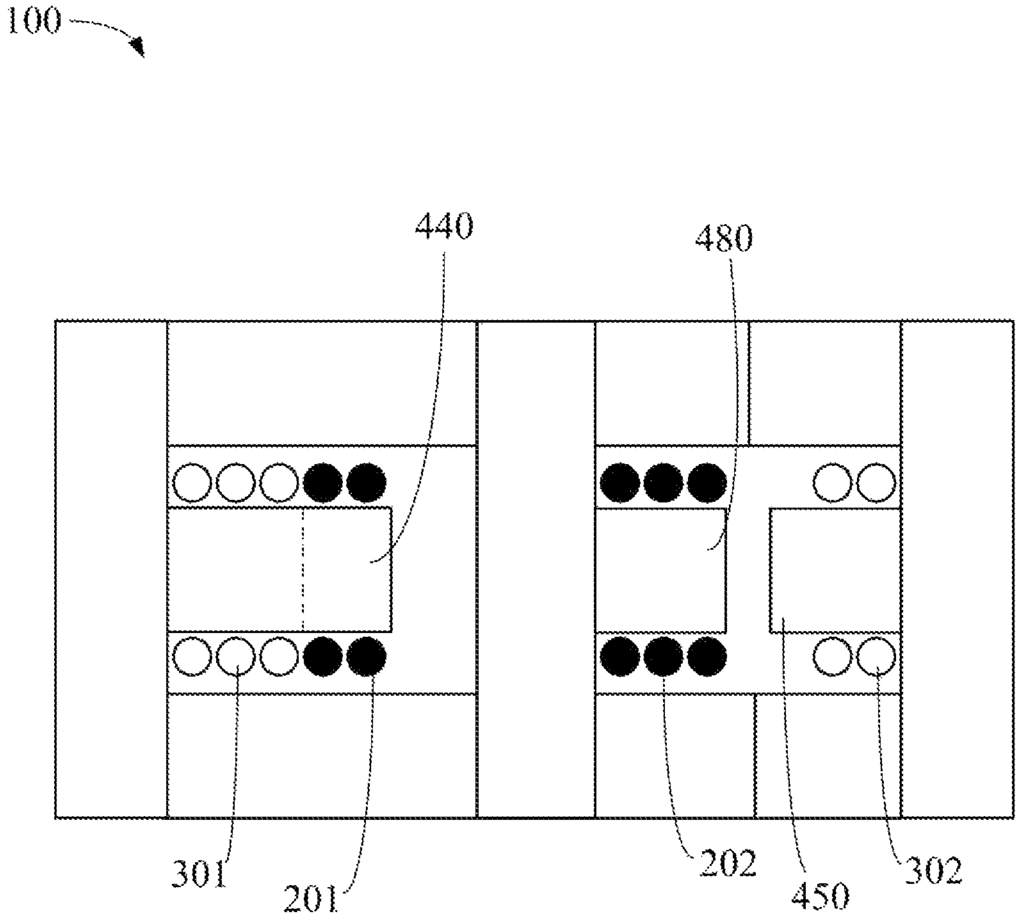
FIG. 5B is a schematic diagram of the magnetic component of the fifth embodiment in another form of the present disclosure.

As shown in FIG. 5B, the structural configuration of the magnetic component 100 in the fifth embodiment can also be considered comprising three E-type iron cores, which still effectively reduces electromagnetic compatibility as mentioned above.

Figure 6A:
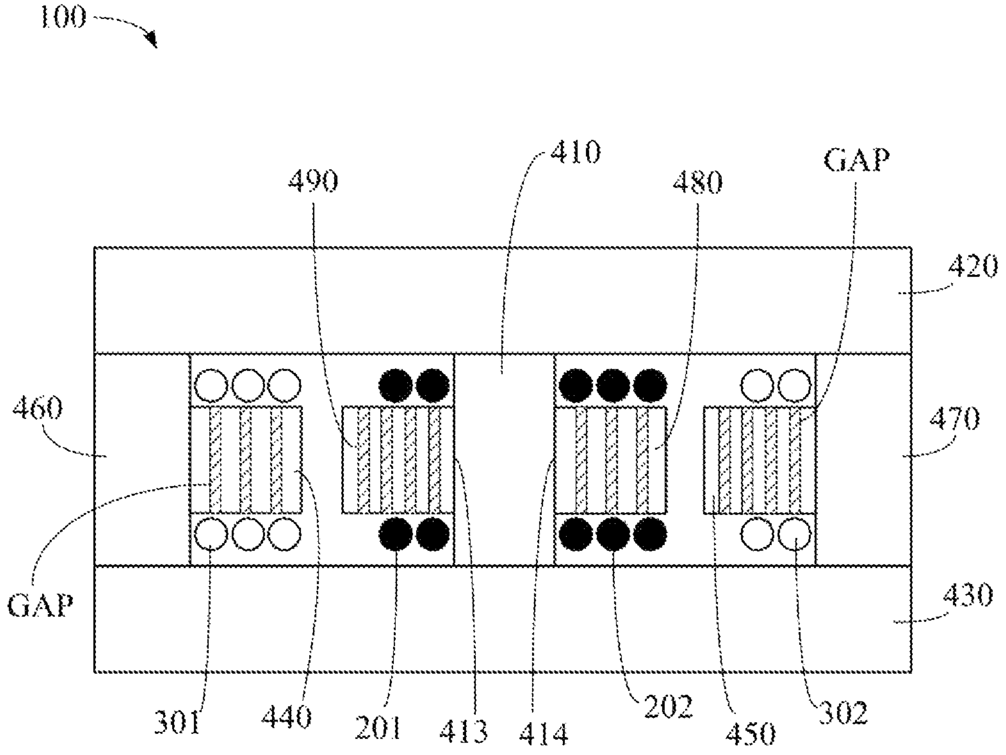
FIG. 6A is a schematic diagram of a magnetic component of the sixth embodiment of the present disclosure.

FIG. 6A shows the sixth embodiment of the magnetic component 100 of the present disclosure. The magnetic component 100 of the sixth embodiment comprises the same components as those of the fifth embodiment, and further comprises a fourth winding column 490 which is disposed on the first side edge 413 of the central column 410. In other words, in the sixth embodiment, the first winding column 440 is disposed at the first supporting column 460, the second winding column 450 is disposed at the second supporting column 470, the third winding column 480 is disposed at the second side edge 414 of the central column 410, and the fourth winding column 490 is disposed at the first side edge 413 of the central column 410.

Through the above arrangement, the first primary coil 201 and the second primary coil 202 of the primary coil group 200 could be winding around the fourth winding column 490 and the third winding column 480 respectively, and the first secondary coil 301 and the second secondary coil 302 of the secondary coil group 300 could be winding around the first winding column 440 and the second winding column 450 respectively.

Compared with other embodiments, the first winding column 440, the second winding column 450, the third winding column 480, and the fourth winding column 490 of the sixth embodiment would respectively have a shorter length. So, the first winding column 440, the second winding column 450, the third winding column 480, and the fourth winding column 490 can be prevented from being bent and deformed in a direction of gravity due to gravity, thereby strengthening and stabilizing the overall structural configuration of the magnetic component 100.

Figure 6B:
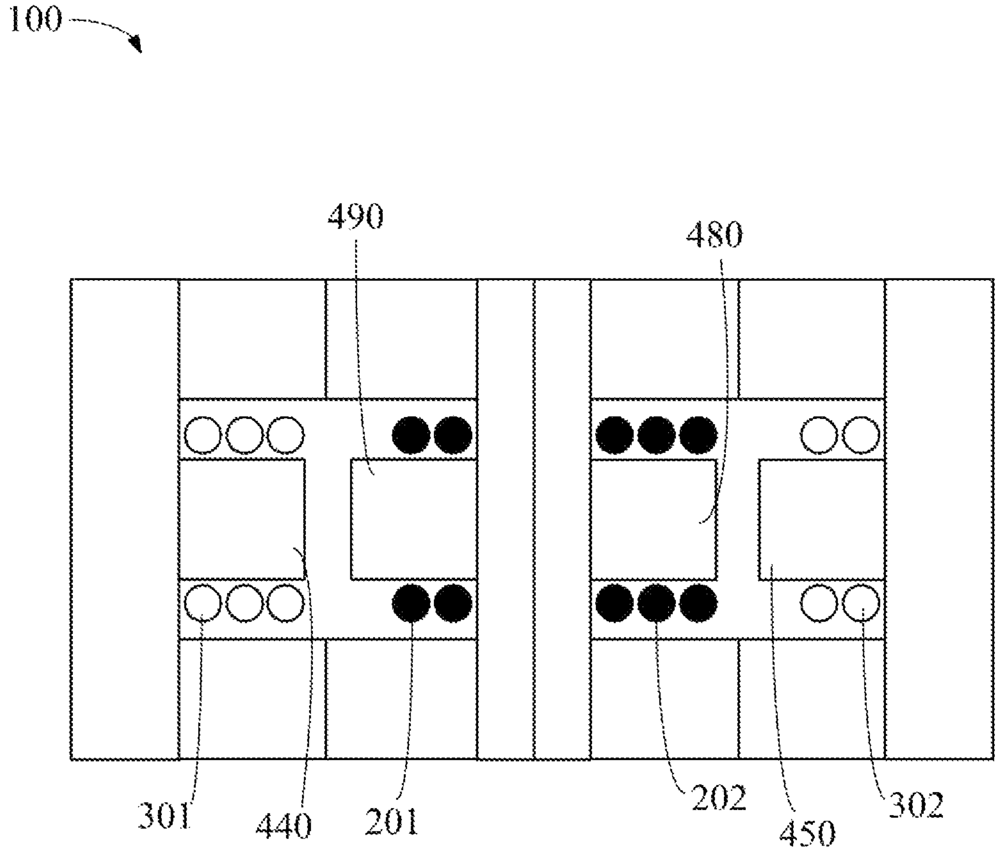
FIG. 6B is a schematic diagram of the magnetic component of the sixth embodiment in another form of the present disclosure.

As shown in FIG. 6B, the structural configuration of the magnetic component 100 in the sixth embodiment can also be considered comprising four E-type iron cores, which could still stabilize the overall structural configuration of the magnetic component 100.

Figure 7:
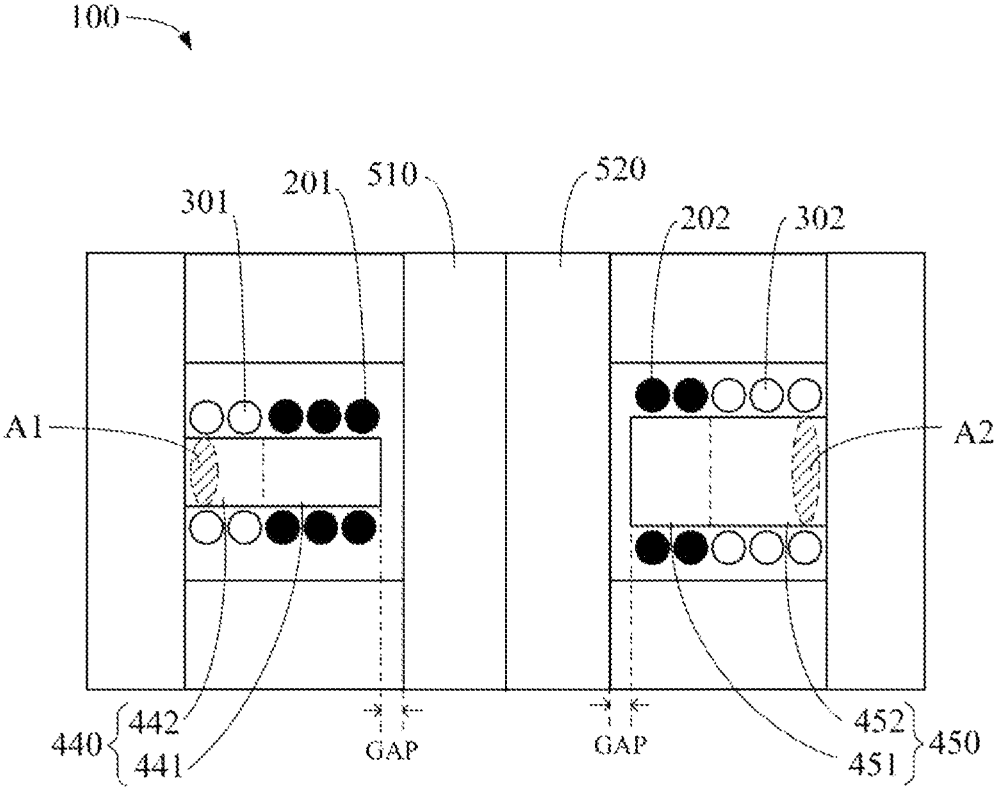
FIG. 7 is a schematic diagram of a magnetic component of the seventh embodiment of the present disclosure.

FIG. 7 is the seventh embodiment of the magnetic component 100 of the present disclosure, which is a variant of FIG. 3B. The difference between the magnetic component 100 of the seventh embodiment and that of FIG. 3B is that the left and right iron cores of the seventh embodiment are unequally distributed (i.e., the sizes of the first winding column 440 and the second winding column 450 are unequal). In other words, in actual production, the appropriate size (e.g., cross-sectional area) of the first winding column 440 and the second winding column 450 can be selected according to the required magnetic flux to optimize the loss of the iron cores.

For example, the first winding column 440 of the seventh embodiment could have a first cross-sectional area A1, the second winding column 450 could have a second cross-sectional area A2, where the first cross-sectional area A1 is not equal to the second cross-sectional area A2. Furthermore, the ratio of the greater to the smaller among the first cross-sectional area A1 and the second cross-sectional area A2 may be ≤2:1 to optimize the loss of the iron cores. In FIG. 7, the second cross-sectional area A2 is greater than the first cross-sectional area A1, and the ratio is not greater than 2:1.

Figure 8:
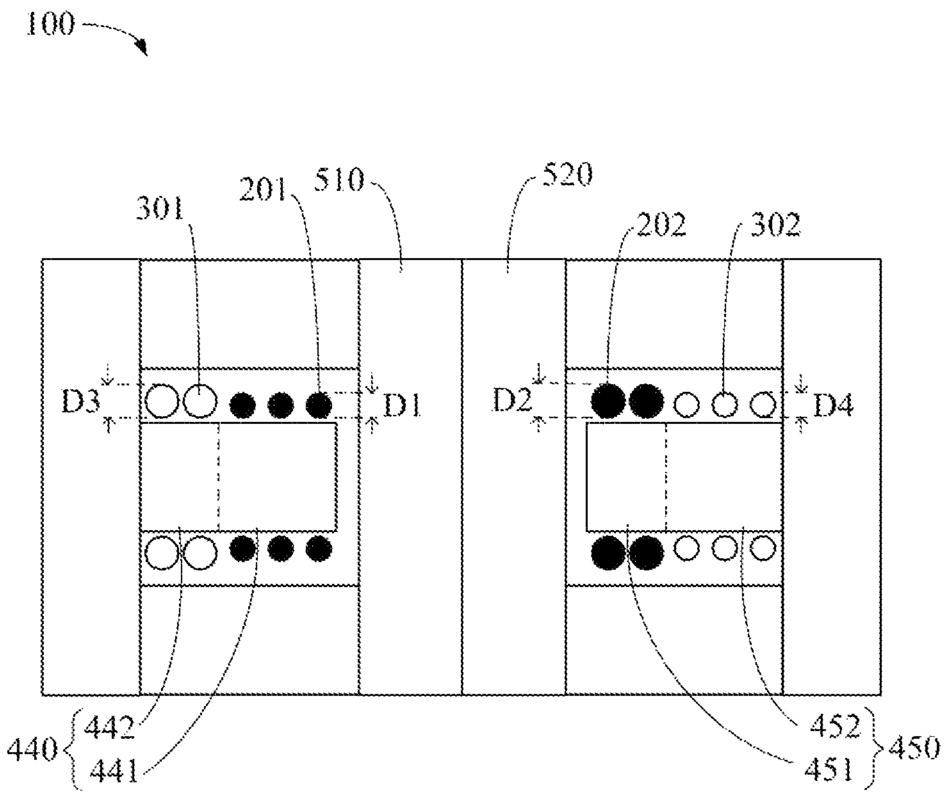
FIG. 8 is a schematic diagram of a magnetic component of the eighth embodiment of the present disclosure.

FIG. 8 is the eighth embodiment of the magnetic component 100 of the present disclosure, which is another variant of FIG. 3B. The difference between the magnetic component 100 of the eighth embodiment and that of FIG. 3B is that a wire diameter of the first primary coil 201 of the primary coil group 200 of the eighth embodiment is not equal to a wire diameter of the second primary coil 202, and a wire diameter of the first secondary coil 301 of the secondary coil group 300 is not equal to a wire diameter of the second secondary coil 302. Specifically, as shown in FIG. 8, when the first primary coil 201 and the second primary coil 202 of the primary coil group 200 have a first wire diameter D1 and a second wire diameter D2, respectively, the first wire diameter D1 is not equal to the second wire diameter D2. When the first secondary coil 301 and the second secondary coil 302 of the secondary coil group 300 have a third wire diameter D3 and a fourth wire diameter D4 respectively, the third wire diameter D3 is not equal to the fourth wire diameter D4.

When the first wire diameter D1 is not equal to the second wire diameter D2, one of the first wire diameter D1 and the second wire diameter D2 has a thicker wire diameter. When the third wire diameter D3 is not equal to the fourth wire diameter D4, one of the third wire diameter D3 and the fourth wire diameter D4 has a thicker wire diameter.

That is, since the total number of the turns of windings on the left and right sides of the magnetic component 100 of the present disclosure are different, in the eighth embodiment, as shown in FIG. 8, by thickening the wire diameter of some of the coils, the second wire diameter D2 of the second primary coil 202 and the third wire diameter D3 of the first secondary coil 301 can be thickened at the same time. Thus, the cross-sectional area of the wire between the second primary coil 202 and the first secondary coil 301 can be increased, thereby reducing the copper loss when the second primary coil 202 and the first secondary coil 301 are energized.

In this embodiment, only one of the first wire diameter D1 of the first primary coil 201 or the fourth wire diameter D4 of the second secondary coil 302 can be thickened, or the first wire diameter D1 of the first primary coil 201 and the fourth wire diameter D4 of the second secondary coil 302 can be thickened at the same time, to reduce copper loss.

Figure 9A:
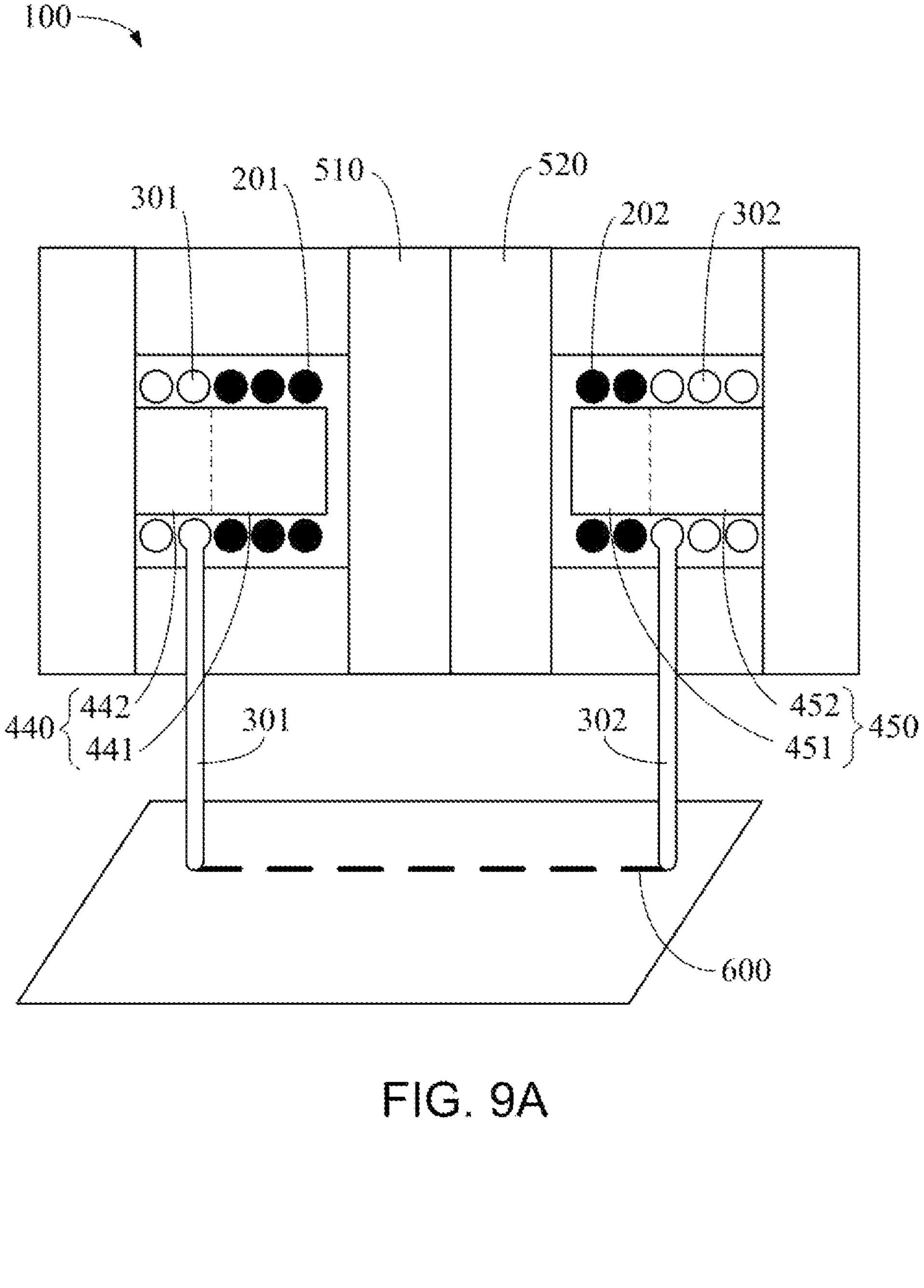
FIG. 9A is a schematic diagram of a magnetic component of the ninth embodiment of the present disclosure.
Figure 9B:
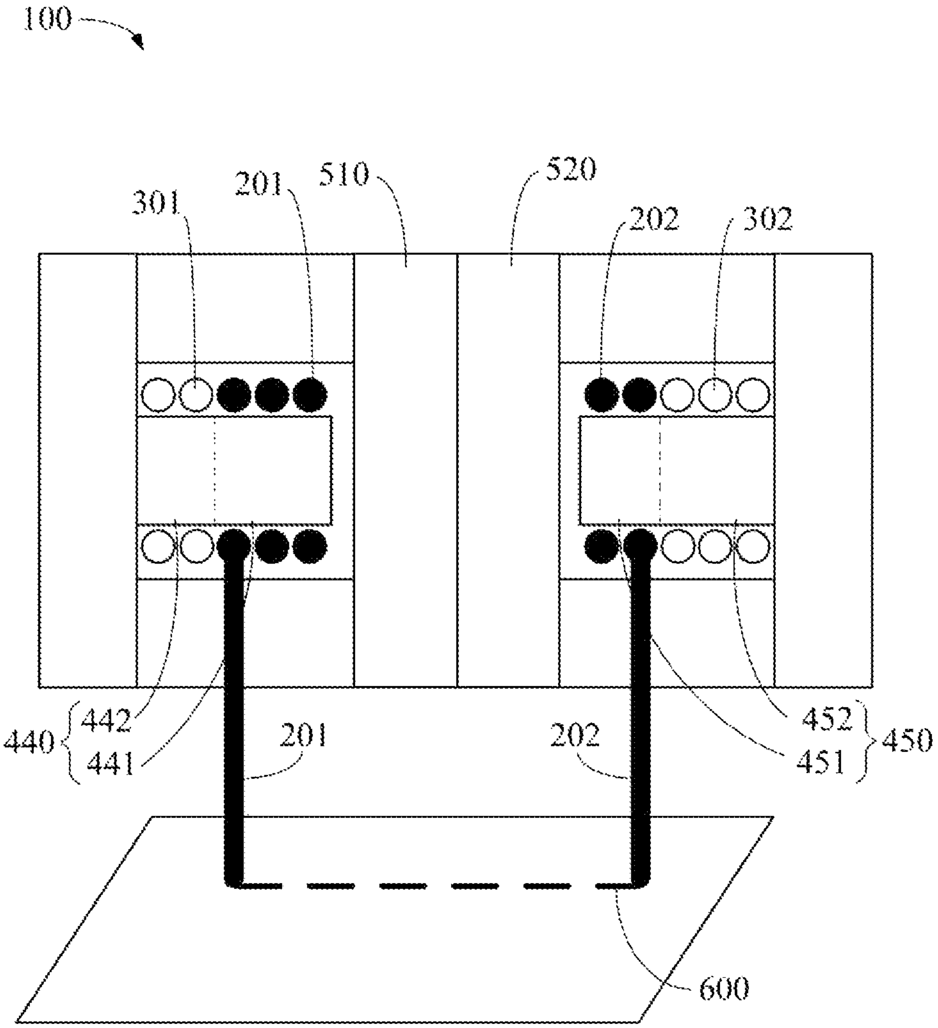
FIG. 9B is a schematic diagram of the magnetic component of the ninth embodiment in another form of the present disclosure.

FIG. 9A and FIG. 9B present the ninth embodiment of the magnetic component 100 of the present disclosure, showing another variant of FIG. 3B. The difference between the magnetic component 100 of the ninth embodiment and that of FIG. 3B is that in the ninth embodiment, the first primary coil 201 is electrically connected to the second primary coil 202 via a first external circuit, or the first secondary coil 301 is electrically connected to the second secondary coil 302 via a second external circuit. In other words, a first electrical connection can be made between the first primary coil 201 and the second primary coil 202 of the primary coil group 200 via the first external circuit, a second electrical connection can be made between the first secondary coil 301 and the second secondary coil 302 of the secondary coil group 300 via a second external circuit, and the first external circuit and the second external circuit can be a PCB wiring 600.

Specifically, when the magnetic component 100 of the ninth embodiment comprises two independent transformers mutually connected in a left-to-right manner, although in general, the coil groups on the left and right sides can be directly electrically connected and conducted, but in the present disclosure, the second electrical connection between the first secondary coil 301 and the second secondary coil 302 can be made via the second external circuit (PCB wiring 600) for electrical connection also as shown in FIG. 9A. In this way, the first secondary coil 301 and the second secondary coil 302 of the left and/to right transformers do not need to be single-wired. Alternatively, as shown in FIG. 9B, the first electrical connection between the first primary coil 201 and the second primary coil 202 can be made via the first external circuit (PCB wiring 600), so that the first secondary coil 301 and the second secondary coil 302 of the left and/to right transformers do not need to be single wired.

Besides, the cross-sectional area of the PCB wiring 600 may be the same as the cross-sectional area of the windings of the primary coil group 200 or the secondary coil group 300, or the cross-sectional area of the PCB wiring 600 is not less than half of the cross-sectional area of the windings of the primary coil group 200 or the secondary coil group 300.

It should be noted that, it is depicted that in the third embodiment (FIG. 3A), the fifth embodiment (FIG. 5), and the seventh embodiment (FIG. 7), an air gap GAP exists between the other end of the first winding column 440 and the central column 410 when one end of the first winding column 440 is connected to the first supporting column 460, and an air gap GAP exists between the other end of the second winding column 450 and the central column 410 when one end of the second winding column 450 is connected to the second supporting column 470. So, energy conversion efficiency between each winding column and the central column can be easily adjusted.

The present disclosure further provides a magnetic core 400 having a first form as shown in the first embodiment of FIGS. 1A and 1B and a second form as shown in the second embodiment of FIG. 2. Both the first form and the second form of the magnetic core 400 are comprising components such as the central column 410, the first cover 420, the second cover 430, the first winding column 440, the second winding column 450, and no air gap exists between the central column 410 and the first cover 420 and between the central column 410 and the second cover 430. Thus, the first form and the second form of the magnetic core 400 could ensure that the air gaps of the first winding column 440 and the second winding column 450 are in the same size by such simple configuration of components.

As shown in the third embodiment of FIGS. 3A and 3B, compared with the first form and the second form, the third form of the magnetic core 400 of the present disclosure further comprises a first supporting column 460 and a second supporting column 470. The first supporting column 460 and the second supporting column 470 strengthen the support between the first cover 420 and the second cover 430 so that the structural configuration of the magnetic core 400 can be more stable. Meanwhile, the gap distance of the air gap of the first winding column 440 and the gap distance of the air gap of the second winding column 450 can be further stabilized to be an identical gap distance. Besides, since the leakage magnetic flux generated by the primary coil group 200 and the secondary coil group 300 is not leaking, the problem of electromagnetic compatibility can be effectively reduced. Also, since the magnetic core of FIG. 7 is only a variant of FIG. 3B in slight difference (i.e., the cores of the left and right sides are unequal), the magnetic cores of FIG. 7 comprises the same features as those of the third embodiment. On the other hand, the embodiment of FIG. 8 only changes the wire diameter of the coil, while the embodiment of FIG. 9 changes the electrical connection method of the coil group. Thus, the magnetic cores of FIGS. 8 and FIG. 9 also have the same features as those of the third embodiment.

As shown in FIG. 4, the fourth form of the magnetic core 400 is an improved variant based on the third form. In the fourth form, the magnetic core 400 may further comprise a third winding column 480, and a fourth winding column 490. The first winding column 440 and the third winding column 480 are disposed at the first supporting column 460, and the second winding column 450 and the fourth winding column 490 are disposed at the second supporting column 470. So, in addition to the advantages of the third form, the fourth form of the magnetic core 400 can also enable the magnetic component 100 to have a thinned winding column height, thereby effectively downsizing the magnetic component 100.

As shown in FIG. 5A and FIG. 5B, the fifth form of the magnetic core 400 is also an improved variant based on the third form. In the fifth form, the magnetic core 400 further comprises a third winding column 480, so that the first winding column 440 is disposed at the first supporting column 460, the second winding column 450 is disposed at the second supporting column 470, and the third winding column 480 is disposed at the second side edge 414 of the central column 410. Thus, when the primary coil group 200 and the secondary coil group 300 are disposed in the magnetic core 400 of the fifth form, both the primary coil group 200 and the secondary coil group 300 would be covered on the inner side of the magnetic core 400. The magnetic core 400 of the fifth form also does not leakage of magnetic flux, which can effectively reduce the problem of electromagnetic compatibility.

As shown in FIG. 6A and FIG. 6B, the sixth form of the magnetic core 400 is an improved variant based on the fifth form. In the sixth form, the magnetic core 400 may further comprise a fourth winding column 490 such that the first winding column 440 is disposed at the first supporting column 460, the second winding column 450 is disposed at the second supporting column 470, the third winding column 480 is disposed at the second side edge 414 of the central column 410, and the fourth winding column 490 is disposed at the first side edge 413 of the central column 410. So, each of the winding columns of the magnetic core 400 of the sixth form would have a shorter height, and each of the winding columns is not easily deformed downward due to gravity. Thus, the overall structural configuration of the magnetic component 100 can be stabilized.

In summary, in the embodiments of the present disclosure, in the structural design of zero air gap between the central column 410 and the first cover 420 and between the central column 410 and the second cover 430, the structural configuration of the magnetic component 100 and the magnetic core 400 can be simplified, and in the case of downsizing to still perform excellent energy conversion efficiency by adjusting the ratio of the number of turns of the primary coil group 200 and the secondary coil group 300 wound on the first winding column 440 and the second winding column 450 to reduce the total loss obtained by iron loss and copper loss during AC charging. Moreover, when a plurality of air gaps GAP are arranged between the first winding column 440 and the second winding column 450, except the air gaps GAP can be evenly distributed between the first winding column 440 and the second winding column 450 (see FIG.

3A), the air gaps GAP can also be unevenly distributed on the winding column (see FIG. 5A and FIG. 6A) to adjust the energy conversion efficiency between each of the winding columns.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A magnetic component, comprising:

a primary coil group comprising a first primary coil and a second primary coil;

a secondary coil group comprising a first secondary coil and a second secondary coil; and a magnetic core, comprising:

a first cover and a second cover;

a central column connecting with the first cover and the second cover, no air gap existing between the central column and the first cover and between the central column and the second cover; and a first winding column and a second winding column respectively disposed on two opposite sides of the central column;

wherein, the first primary coil and the second primary coil are respectively winding around the first winding column and the second winding column, where the number of turns of the first primary coil is different from the number of turns of the second primary coil; the first secondary coil and the second secondary coil are respectively winding around the first winding column and the second winding column, where the number of turns of the first secondary coil is different from the number of turns of the second secondary coil;

wherein the first primary coil is wounding around a first winding part of the first winding column on the side adjacent to the central column, the first secondary coil is wounding around a second winding part of the first winding column on the side away from the central column, and the second primary coil is wounding around a third winding part of the second winding column on the side adjacent to the central column, the second secondary coil is wounding around a fourth winding part of the second winding column on the side away from the central column;

wherein the first winding column includes a plurality of first air gaps, and the second winding column include a plurality of second air gaps, wherein each of the first air gaps is covered by the first primary coil or the first secondary coil in a radial direction of the first winding column, and each of the second air gaps is covered by the second primary coil or the second secondary coil in a radial direction of the second winding column.

2. The magnetic component according to claim 1 comprising a first supporting column and a second supporting column respectively connected to the first cover and the second cover, the first winding column being disposed between the first supporting column and the central column, the second winding column being disposed between the second supporting column and the central column.

3. The magnetic component according to claim 2, wherein one end of the first winding column is connected to the first supporting column; an air gap exists between the other end of the first winding column and the central column; one end of the second winding column is connected to the second supporting column; an air gap exists between the other end of the second winding column and the central column.

4. The magnetic component according to claim 1, wherein the number of the air gap of the first winding column is different from the number of turns of the first primary coil, wherein the number of the air gap of the second winding column is different from the number of turns of the second primary coil.

5. The magnetic component according to claim 1, wherein the number of turns of the first primary coil is equal to the number of turns of the second secondary coil, and the number of turns of the second primary coil is equal to the number of turns of the first secondary coil.

* * * * *